US 8,260,891 B2

United States Patent
Abels et al.

(10) Patent No.: US 8,260,891 B2
(45) Date of Patent: Sep. 4, 2012

(54) SYSTEM AND METHOD FOR THE PROVISION OF SECURE NETWORK BOOT SERVICES

(75) Inventors: Timothy E. Abels, Pflugerville, TX (US); Bogdan Odulinksi, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/927,897

(22) Filed: Oct. 30, 2007

(65) Prior Publication Data

US 2009/0113029 A1  Apr. 30, 2009

(51) Int. Cl.
*G06F 15/177* (2006.01)

(52) U.S. Cl. ........ 709/222; 709/208; 709/220; 709/221; 713/1; 714/752

(58) Field of Classification Search .................. 709/208, 709/220–222; 713/1; 714/752
See application file for complete search history.

(56) References Cited

U.S. PATENT DOCUMENTS

| | | | |
|---|---|---|---|
| 6,763,458 B1 | 7/2004 | Watanabe et al. | |
| 6,810,478 B1 * | 10/2004 | Anand et al. ...................... | 713/2 |
| 6,946,972 B2 | 9/2005 | Mueller et al. | |
| 6,948,099 B1 | 9/2005 | Tallam | |
| 6,963,981 B1 | 11/2005 | Bailey et al. | |
| 6,965,989 B1 | 11/2005 | Strange et al. | |
| 6,970,909 B2 | 11/2005 | Schulzrinne | |
| 6,973,569 B1 | 12/2005 | Anderson et al. | |
| 6,973,587 B1 * | 12/2005 | Maity et al. ................... | 714/6.31 |
| 6,993,649 B2 | 1/2006 | Hensley | |
| 7,017,039 B2 | 3/2006 | Hensley | |
| 7,043,604 B2 | 5/2006 | Ogasawara et al. | |
| 7,093,989 B2 | 8/2006 | Walmsley et al. | |
| 7,099,996 B2 | 8/2006 | Ogasawara et al. | |
| 7,103,772 B2 | 9/2006 | Jorgensen et al. | |
| 7,121,639 B2 | 10/2006 | Plunkett | |
| 7,134,007 B2 | 11/2006 | Zimmer et al. | |
| 7,146,512 B2 | 12/2006 | Rothman et al. | |
| 7,197,606 B2 | 3/2007 | Kobayashi et al. | |
| 7,207,039 B2 * | 4/2007 | Komarla et al. ............... | 717/178 |
| 7,251,725 B2 * | 7/2007 | Loison et al. ..................... | 713/1 |
| 7,401,254 B2 | 7/2008 | Davies | |
| 2005/0138346 A1 | 6/2005 | Cauthron | |
| 2005/0144431 A1 | 6/2005 | Lin et al. | |
| 2005/0207105 A1 | 9/2005 | Davies | |
| 2005/0216668 A1 | 9/2005 | Kobayashi et al. | |
| 2005/0228903 A1 | 10/2005 | Lerner et al. | |
| 2006/0004982 A1 | 1/2006 | Matheny | |
| 2006/0155837 A1 | 7/2006 | Kobayashi et al. | |
| 2006/0218388 A1 | 9/2006 | Zur et al. | |

(Continued)

OTHER PUBLICATIONS

Intel Corp., Preboot Execution Environment Environment Specification Version 2.1, Sep. 20, 1999, pp. 12-18, available at http://www.pix.net/software/pxeboot/archive/pxespec.pdf.

(Continued)

*Primary Examiner* — Yves Dalencourt
(74) *Attorney, Agent, or Firm* — Baker Botts L.L.P.

(57) ABSTRACT

A system and method for providing a network boot is provided in which the entire length of the communications link between the client computer and the boot server is secure. Because the communications link between the client and the boot server is secure, an identifier for that uniquely identifies the client can be passed to the boot server, and the boot server is operable to serve a boot image to the client computer on the basis of the uniquely identified client computer.

20 Claims, 3 Drawing Sheets

U.S. PATENT DOCUMENTS

| | | |
|---|---|---|
| 2006/0236150 A1 | 10/2006 | Lintz, Jr. et al. |
| 2006/0236198 A1 | 10/2006 | Lintz, Jr. et al. |
| 2006/0259291 A1 | 11/2006 | Dunham et al. |
| 2008/0028052 A1* | 1/2008 | Currid et al. ............... 709/222 |
| 2010/0125770 A1* | 5/2010 | Keith, Jr. ................... 714/752 |

OTHER PUBLICATIONS

Compaq Computer Corp. et al, Bios Boot Specification Version 1.01, Jan. 11, 1996, p. 9, available at http://www.phoenix.com/NR/rdonlyres/56E38DE2-3E6F-4743-835F-B4A53726ABED/0/specsbbs101.pdf.

Morgan et al., Enabling Diskless Windows Boot with iSCSI, WinHEC2006, available at download.microsoft.com/download/5/b/9/5b97017b-e28a-4bae-ba48-174cf47d23cd/STO026_WH06.ppt.

Etherboot/gPXE Wiki, available at http://www.etherboot.org/wiki/start, 2009.

IBM, iBoot—Remote Boot over iSCSI, available at http://www.haifa.ibm.com/projects/storage/iboot/index.html, 2002.

* cited by examiner

SYSTEM AND METHOD FOR THE PROVISION OF SECURE NETWORK BOOT SERVICES

TECHNICAL FIELD

The present disclosure relates generally to computer systems and information handling systems, and, more particularly, to a system and method for identifying the signal integrity of a signal from the tape drive.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system, such as a computer system, may be coupled to a network that allows for the remote boot of the computer system. A network boot of a computer system involves a boot of the computer system from a boot image on a network. The boot image is downloaded from the network to the computer system, where the boot image is executed by the processor of the computer system and the computer system is initiated. Existing processes and protocols for performing a network boot may compromise the security of the computer system or the network and may exceptionally complex.

As one example, the Preboot eXecution Environment (PXE) protocol does not encrypt the entire remote boot process. PXE also involves a complex configuration management scheme in which a user who implements a remote boot server must carefully implement a directory structure at the remote boot server to insure that the correct boot images are delivered to the client computer. In addition, because PXE involves the mapping of client computers to boot images by the MAC address of the client computer, the security of the client computer and network could be compromised. As another example, the Internet SCSI (iSCSI) network protocol does not provide for encryption of the boot process, and this drawback is especially apparent when the iSCSI protocol is operating in transport mode. The Internet iSCSI protocol is also complicated and does not readily support the mapping of boot images to multiple clients having a common logical unit (LUN) or the dynamic mapping of clients. Overcoming the lack of secure boot protocols often involves proprietary security tools, which themselves often suffer from vendor and version dependencies, creating the risk of legacy systems that are problematic and not scalable.

SUMMARY

In accordance with the present disclosure, a system and method for providing a network boot is provided in which the entire length of the communications link between the client computer and the boot server is secure. Because the communications link between the client and the boot server is secure, an identifier for that uniquely identifies the client can be passed to the boot server, and the boot server is operable to serve a boot image to the client computer on the basis of the uniquely identified client computer.

The system and method disclosed herein is technically advantageous because the communications link between the client computer and the boot server is secure. The presence of a secure communications link allows information concerning identity of the client to be transmitted to the boot server. Because the boot server is aware of the precise identity of the client, the boot server can serve to the client a boot image that is tailored for the hardware and software features of the client computer system. Another technical advantage of the system and method disclosed herein is the system and method can be used in any network that supports Internet routing. Because Internet routing is employed, the extensive implementation of hardware and software infrastructure is not necessary. In addition, because of the lack of proprietary hardware and software, the system and method disclosed herein can be readily scaled and is not overly complex, the system and method can be implemented in a manner that improves the customer experience. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
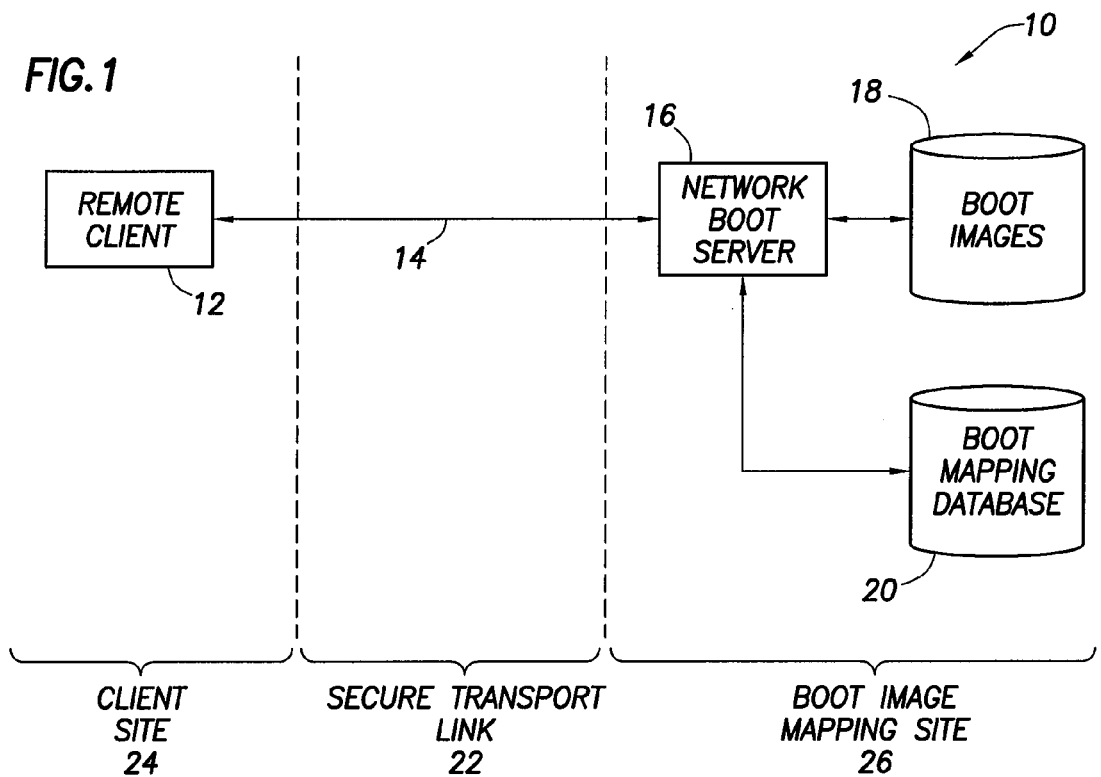
FIG. 1 is architectural diagram of a communications network.

Shown in FIG. 1 is an architectural diagram of a communications network, which is indicated generally at 10. Communications network 10 includes a client 12 at a client site 14. Client 12 is coupled to a boot image mapping site 26 through a communications link 14. Communications link 14 comprises a secure transport link 22. In one embodiment, the secure transport link is accomplished according to the HTTP/S communications protocol, which involves HTTP communications occurring over an encrypted SSL or TLS connection. At the boot image mapping site 26, a network boot server 16 provides boot images to the remote client 12. The boot images are served from a boot image database 18. A typical network boot server will provide boot images to several clients at multiple remote sites. The boot images for each client may differ depending on the hardware and software requirements of the client. A boot mapping database identifies to the network boot server the specific boot image that is to be provided to each remote client.

Because the secure transport link 22 operates according to the HTTP/S communications protocol, the communications link is Internet-based and secure. Because the communications link is secured, eavesdropping or other security breaches involving the communications link between the client site and the boot image mapping site is minimized or eliminated entirely. As an alternative to the HTTP/S protocol, the secure transport link between the remote client and the boot image mapping site could operate according to the IP Security (IPSec) protocol, which involves the use of cryptographic protocols to provide for secure, Internet-based communication.

Thus, whether HTTP/S or IPSec is used as the secure communications protocol for the secure transport link 22, the entire network bootstrapping process is secure between the remote client and the boot image mapping site. Because transport link 22 is secure, information concerning the identity of the remote client can be safely passed across the transport link. As an example, a unique identifier for the computer system of the remote client, the IP address of the remote client, the MAC address of the remote client, a UUID associated with the remote client, or the SMBIOS parameters of the remote client can be transmitted to the remote boot image mapping site. In addition, DNS information associated with the remote client can be used to identify the remote client for the purpose of assigning a boot image to the remote client. As such, the actual identity of the computer system used at the remote client can be passed securely between the remote client and the boot image mapping site. The specificity of these parameters can be used by remote boot image mapping site to provide and, if necessary, construct a boot image that matches the requirements of the computer system of the remote client.

Figure 2:
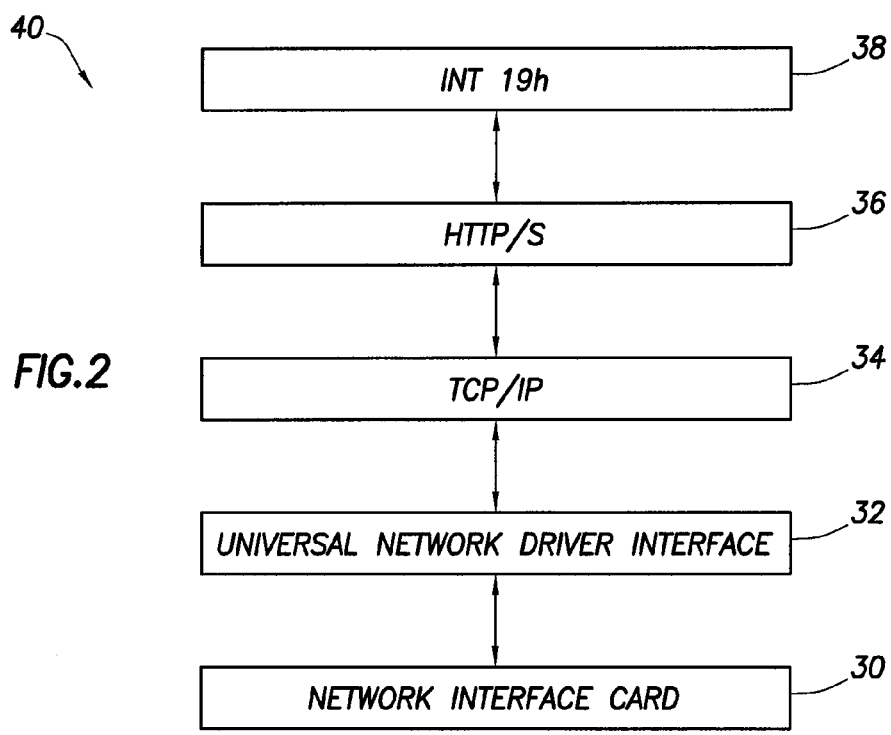
FIG. 2 is a layer diagram of the architecture of the network boot system.

Shown in FIG. 2 is a layer diagram 40 of the architecture of the network boot system described herein. The remote client 12 includes a network interface card 30, which communicates through the Universal Network Driver Interface (UNDI) 32 and the TCP/IP communication protocol 34. The TCP/IP protocol itself functions according to the HTTP/S secure communications standard. As indicated in FIG. 2, the client is able to initiate Int 19*h* calls (38) to manage the remote boot process through an option ROM at the network interface card 30.

Figure 3A:
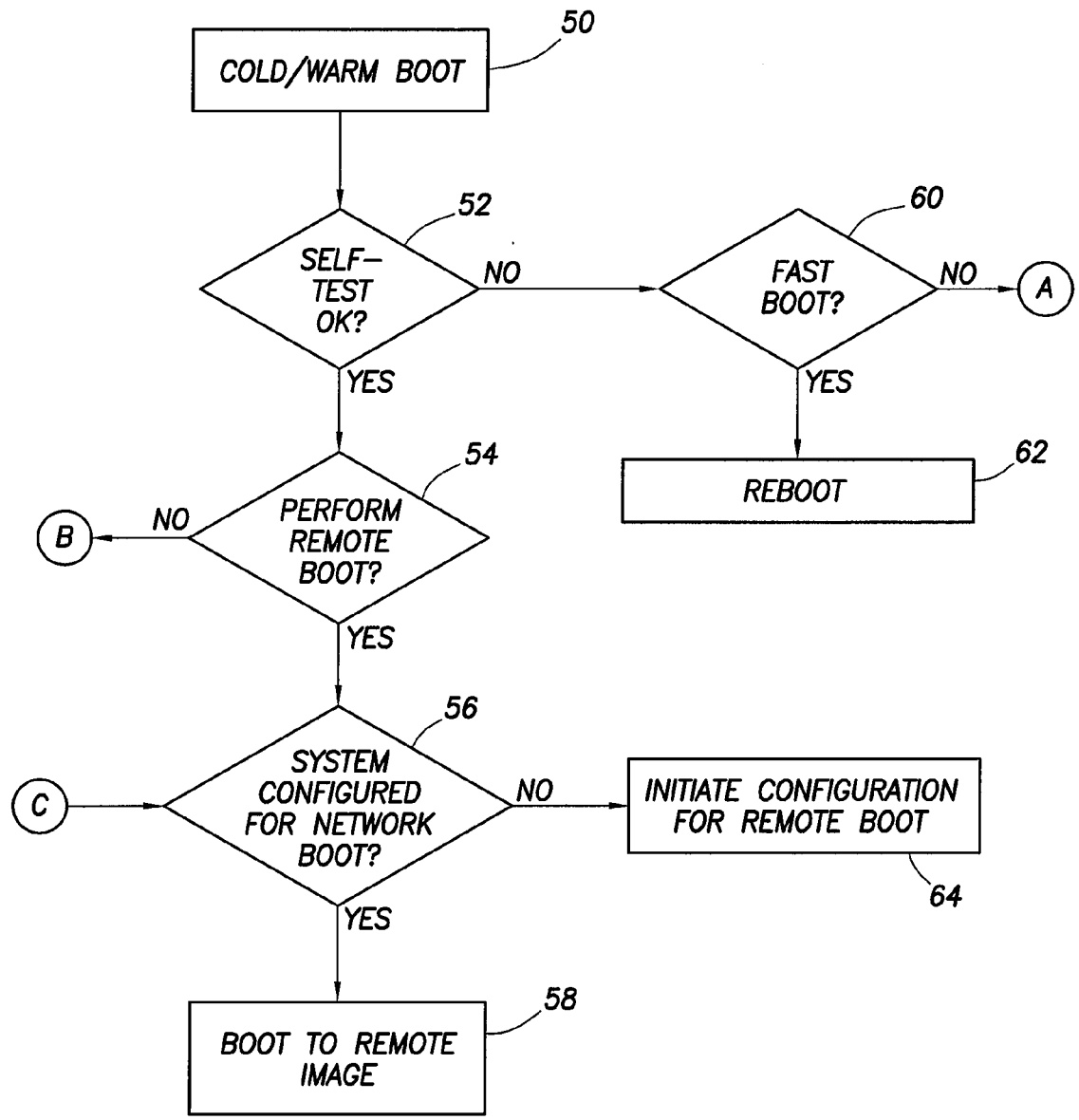
FIGS. 3A-3C are a flow diagram of a series of method steps for performing a remote boot of a client across a remote boot network.
Figure 3C:
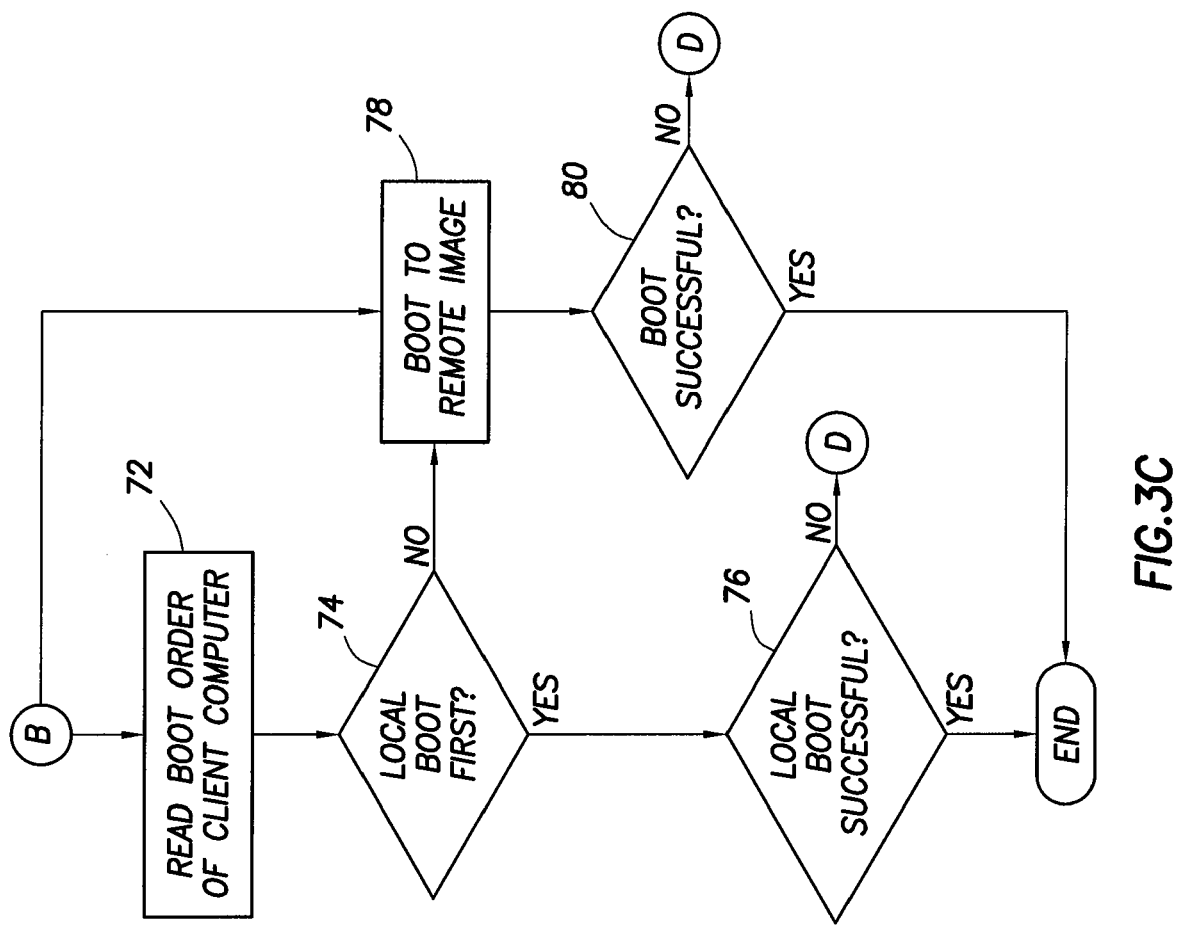
Figure 3B:
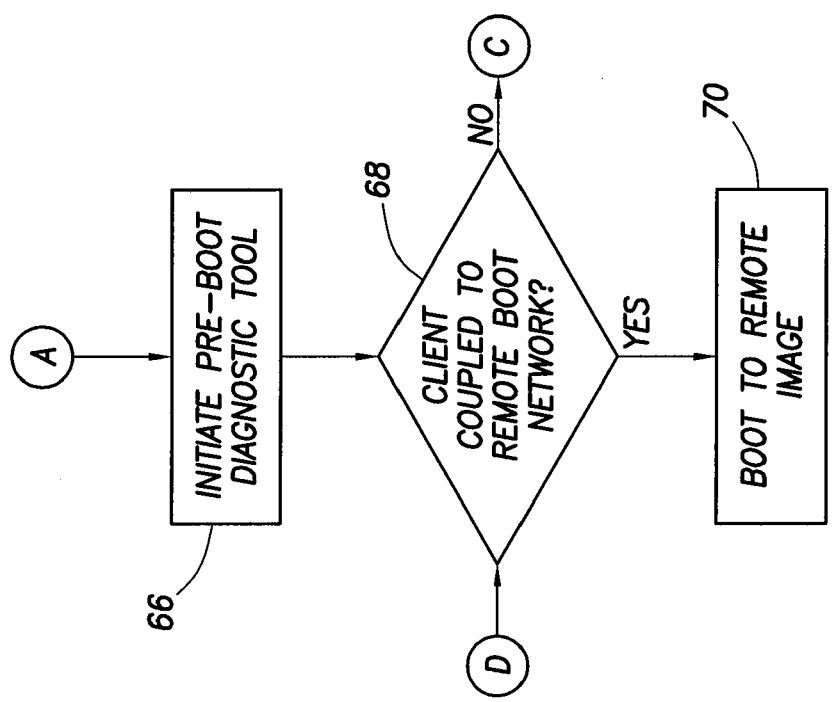

Shown in FIGS. 3A-3C is a flow diagram of a series of method steps for performing a remote boot of a client across a remote boot network. At step 50, a cold or warm boot is initiated. Following the initiation of the boot, it is determined at step 52 if a self-test diagnostic in the client completed successfully. If the self-test diagnostic completed successfully, the client computer system determines at step 54 if a remote boot will be performed. A remote boot may be performed, for example, if the boot order of the client computer does not identify a bootable drive on the client computer.

If it is determined at step 54 that the client computer will not perform a remote boot, the flow diagram proceeds to Step B in FIG. 3C. As indicated in FIG. 3C, the client computer can follow two paths from Step B. According to one path, the client computer at step 78 can boot to a remote secure service as disclosed herein. Following the attempt to boot to a remote service at step 78, it is determined at step 80 if the boot was successful. If successful, the flow diagram and the boot process conclude. If not successful, the flow diagram jumps to Step D in FIG. 3B, where it is determined in step 68 if the local computer is coupled to the boot network. If so, the local computer attempts to reboot the local computer at step 70. If the local computer is not coupled to the boot network, the flow diagram jumps to Step C in FIG. 3A for a determination at step 56 of whether the system is configured for a network boot.

The other option from Step B in FIG. 3C involves reading the boot order of the client computer. If the boot order specifies that a local boot is to be performed at the computer system, the client computer attempts a local boot and evaluates whether that local boot is successful at step 76. If the local boot is successful, the boot process concludes. If the local boot is not successful, the flow diagram jumps to Step D in FIG. 3B, where it is determined in step 68 if the local computer is coupled to the boot network. If so, the local computer attempts to boot the local computer at step 70. If the local computer is not coupled to the boot network, the flow diagram jumps to Step C in FIG. 3A for a determination at step 56 of whether the system is configured for a network boot.

If it is determined at step 54 that the client computer will perform a remote boot, it is next determined at step 56 if the client computer is configured for a network boot. If the client computer is configured for a network boot, the client computer securely boots to a boot image on the network at step 58 and the boot process concludes. If it is determined that the client computer is not configured for a remote boot, the client computer is configured for a remote boot at step 64. Following step 64, the flow diagram could advance to step 58, where the computer system will remotely and securely boot across the network.

If it is determined at step 52 that the self-test diagnostic tool did not complete successfully, the diagnostic tool determines at step 60 if the boot was designated as a fast. If so, the computer system reboots at step 62 in an attempt to boot successfully as a fast boot, and the flow diagram of FIG. 3 ends. If the client is unable to reboot with a fast boot, the client computer may proceed with an application of the pre-boot diagnostic tools of step 66 (which is described below). If the self-test diagnostic tool did not complete successfully and if the boot is not a fast boot, the process continues at Step A in FIG. 3B, where the client computer initiates a pre-boot diagnostic tool. After the execution of the pre-boot diagnostic tool, the client computer determines if the client computer is coupled to the remote boot network. If the client computer is coupled to the remote boot network, the client computer performs a network boot over a secure connection between the client computer and the remote boot image mapping site. If the client computer is not coupled to the remote boot network, the client computer determines at step 56 of FIG. 3A if the client computer can be coupled to the remote boot network.

The network boot system and methodology described herein is advantageous for several reasons. It is secure, thereby providing a mechanism for the transport of unique identifiers for the client computer system, which provides for a more flexible and more accurate delivery of the boot image to the client computer. The network boot system described herein is able to use a secure transfer protocol, such as HTTP/S or IPSec, to provide for remote first stage and second stage boots at a client computer. The architecture of the remote boot service is flexible in that it involves Internet routing and does not involve the addition of a hardware or software infrastructure. The remote boot system disclosed herein is also scalable and is easily extensible as part of the Extensible Firmware Interface (EFI). As such, the remote boot system of the present disclosure can be used with existing option ROM configurations at the remote client. In addition, because the system involves Internet routing and is simplified over previous remote boot systems, the system of the present disclosure provides a simpler and more manageable customer experience.

Although the present invention has been described herein with reference to specific protocols and communication standards, it should be recognized that the system for providing secure network boot services described herein is not limited in its application to the specific protocols and communication standards set out herein. Although the present disclosure has been described in detail, it should be understood that various changes, substitutions, and alterations can be made hereto without departing from the spirit and the scope of the invention as defined by the appended claims.

What is claimed is:

1. A method for remotely booting a computing system, comprising:
providing a boot server;
providing a boot image stored in memory that is coupled to the boot server;
providing a computing system;
determining if the computing system includes a bootable drive;
configuring the computing system for connection to the boot server if the computing system does not include a bootable drive and if the computing system is not configured for connection to the boot server;
coupling the computing system to the boot server through a secure communications link;
if the boot image matches hardware and software requirements of the computing system, serving at the boot server the boot image to the computing system, wherein the boot image is provided by the boot server on the basis of a unique client identifier for the computing system that is transmitted on the secure communications link between the computing system and the boot server, wherein the boot image is unique to the computing system;
if the boot image does not match the hardware and software requirements of the computing system, constructing at the boot server a new boot image that matches the hardware and software requirements of the computing system, serving the new boot image to the computing system over the secure communications link, and storing the new boot image on the memory that is coupled to the boot server, wherein the new boot image is unique to the computing system; and
booting the computing system from the boot image provided by the boot server.

2. The method for remotely booting a computing system of claim 1, wherein the secure communications link is an Internet-based communications link.

3. The method for remotely booting a computing system of claim 2, wherein the secure communications link incorporates the HTTP/S communications protocol.

4. The method for remotely booting a computing system of claim 2, wherein the secure communications link incorporates the IP Security communications protocol.

5. The method for remotely booting a computing system of claim 1, wherein the unique client identifier for the computing system is the IP address of the computing system.

6. The method for remotely booting a computing system of claim 1, wherein the unique client identifier for the computing system is DNS information associated with the computing system.

7. The method for remotely booting a computing system of claim 1, wherein the unique client identifier for the computing system is UUID information associated with the computing system.

8. The method for remotely booting a computing system of claim 1, wherein the unique client identifier for the computing system is SMBIOS parameters associated with the computing system.

9. A network for the provision of remote boot images to a computing system comprising:
a computing system;
a boot server, wherein the boot server is coupled to the computing system through a secure communications link; and
a boot image database coupled to the boot server;
wherein the computing system is operable to determine if the computing system includes a bootable drive and to pass to the boot server a unique client identifier that uniquely identifies the computing system to the boot server if the computing system does not include a bootable drive;
wherein the boot server is operable to select an existing boot image on the basis of the unique client identifier from the computing system, wherein the selected existing boot image is unique to the computing system and matches hardware and software requirements of the computing system;
wherein the boot server is operable to construct a new boot image that matches hardware and software requirements of the computing system if an existing boot image does not match the hardware and software requirements of the computing system, wherein the new boot image is unique to the computing system;
wherein the boot server is operable to serve the existing boot image to the computing system if the existing boot image matches the hardware and software requirements of the computing system;
wherein the boot server is operable to serve the new boot image to the computing system if the boot server constructs the new boot image; and
wherein the boot server is operable to store the new boot image in the boot image database if the boot server serves the new boot image to the computing system.

10. The network of claim 9, wherein the secure communications link is Internet-based.

11. The network of claim 10, wherein the secure communications link incorporates the HTTP/S communications protocol.

12. The network of claim 10, wherein the secure communications link incorporates the IP Security communications protocol.

13. The network of claim 9, wherein the unique client identifier for the computing system is the IP address of the computing system.

14. The network of claim 9, wherein the unique client identifier for the computing system is DNS information associated with the computing system.

15. A method for providing boot images to a remote client from a boot server, comprising:
   receiving from the remote client over a secure communications link a request for a boot image and a unique client identifier that uniquely identifies the remote client if the remote client does not include a bootable device;
   if an existing boot image in a database associated with the boot server meets hardware and software requirements of the uniquely identified remote client, selecting the existing boot image and serving the existing boot image to the uniquely identified remote client over the secure communications link, wherein the selected boot image is unique to the uniquely identified remote client; and
   if an existing boot image in the database associated with the boot server does not meet the hardware and software requirements of the uniquely identified remote client, constructing at the boot server a new boot image, serving the new boot image to the uniquely identified remote client over the secure communications link, and storing the new boot image in the database associated with the boot server, wherein the new boot image is unique to the uniquely identified remote client.

16. The method for providing boot images to a remote client from a boot server of claim 15, wherein the secure communications link is an Internet-based communications link.

17. The method for providing boot images to a remote client from a boot server of claim 16, wherein the secure communications link incorporates the HTTP/S communications protocol.

18. The method for providing boot images to a remote client from a boot server of claim 16, wherein the secure communications link incorporates the IP Security communications protocol.

19. The method for providing boot images to a remote client from a boot server of claim 16, wherein the unique client identifier received from the remote client is DNS information associated with the remote client.

20. The method for providing boot images to a remote client from a boot server of claim 16, wherein the unique client identifier received from the remote client is the IP address of the remote client.

* * * * *